United States Patent [19]

De Ceuster et al.

[11] 4,343,679

[45] Aug. 10, 1982

[54] PROCESS FOR RECLAIMING WASTE PAPER

[75] Inventors: Jean De Ceuster, Vilvoorde; Paul Duprez, Brussels, both of Belgium

[73] Assignee: Interox (Societe Anonyme), Brussels, Belgium

[21] Appl. No.: 199,815

[22] Filed: Oct. 23, 1980

[30] Foreign Application Priority Data

Oct. 23, 1979 [FR] France .................................. 79 26581

[51] Int. Cl.$^3$ ................................................ D21C 5/02
[52] U.S. Cl. .......................................... 162/4; 162/5; 162/6
[58] Field of Search ..................................... 142/4, 5, 6

[56] References Cited

U.S. PATENT DOCUMENTS

| | | | |
|---|---|---|---|
| 2,005,742 | 6/1935 | Hines | 162/5 |
| 2,112,562 | 3/1981 | Fisher | 162/5 |
| 2,200,622 | 10/1945 | Hines | 162/5 |
| 3,839,215 | 10/1974 | Mulders | 252/181 |
| 3,920,570 | 11/1975 | Mulders | 252/89 |
| 4,243,478 | 1/1981 | Pfalzer et al. | 162/5 |

FOREIGN PATENT DOCUMENTS

| | | |
|---|---|---|
| 492195 | 7/1919 | France . |
| 32789 | 2/1928 | France . |
| 1363874 | 5/1964 | France . |
| 991116 | 5/1965 | United Kingdom ............. 162/5 |
| 1062182 | 3/1967 | United Kingdom . |
| 1296412 | 11/1972 | United Kingdom . |

*Primary Examiner*—William F. Smith
*Attorney, Agent, or Firm*—Spencer & Kaye

[57] ABSTRACT

Process for reclaiming waste paper without deinking which involves pulping the waste paper in the presence of soft water and then adding to the pulp thus obtained a compound capable of liberating, in aqueous solution, ions with a positive charge equal to or greater than 2.

10 Claims, No Drawings

PROCESS FOR RECLAIMING WASTE PAPER

BACKGROUND OF THE INVENTION

The present invention relates to a process for reclaiming waste paper so that it can be recycled in the form of a pulp.

Reclaimed waste paper constitutes an important source of raw material for the paper industry. This waste paper is disintegrated in the aqueous phase, most often in a pulper, so as to obtain a pulp which is generally used for the production of wrapping paper and packing board or newsprint. In view of the fact that the extent to which reclaimed fibres are used in packaging products in already very great, other outlets have also been invisaged for waste paper such as production of printing/writing paper or tissue paper. In this case, it is important to have a pulp with a sufficient degree of brightness. A satisfactory degree of brightness can be achieved by using additional deinking and/or bleaching treatments. Other treatments (vat retention, removal of heavy and light impurities, deflaking, refining etc.) are often included in the reclaiming cycles.

It has thus been proposed to reclaim waste paper in several stages including a disintegration stage in the presence of soft water and non ionic detergents followed by deinking by washing the pulp obtained (French Pat. No. 1 363 874 filed on the Sept. 28, 1961 in the name of The Hollified Corp.). Although this type of process enables the inks to be well loosened, it does have certain serious disadvantages due to the presence of quite considerable quantities of ink in the washing water. In fact, if it is desired that a sufficient level of brightness be maintained, these can be recycled only in a limited quantity, which leads to the consumption of excessive quantities of water. Moreover, it is necessary to provide for treatments to remove inks in the washing water circuits, which make the process very complicated. The removal of ink-rich residues originating from these treatments is particularly difficult because of the need to protect the environment. Finally, ink deposits form in the washing water systems.

SUMMARY OF THE INVENTION

The object of the invention is to provide a process for reclaiming waste paper which makes it possible to avoid the above-mentioned disadvantages and more particularly to avoid the formation of inkrich aqueous effluent. The invention also makes it possible to obtain a pulp with improved brightness which can be used for the production of printing paper such as newsprint.

To achieve these objects, the invention relates to a process for reclaiming waste paper without deinking which involves pulping waste paper in the presence of soft water and then adding to the pulp thus obtained a compound capable of liberating, in aqueous solution, ions with a positive charge equal to or greater than 2.

DETAILED DESCRIPTION OF THE INVENTION

Various types of such compounds can be used according to the invention. Generally speaking, the compound added to the pulp is chosen from compounds of the elements of groups IIa and IIIa of the periodic table of elements. It is preferable to use a compound capable of liberating calcium or aluminium ions, in aqueous solution. Particularly good results have been obtained by adding to the pulp a compound capable of liberating calcium ions in aqueous solution. Various types of compounds capable of liberating the above-mentioned ions can be used according to the invention. Generally speaking, they are chosen from compounds whose solubility in water is at least 0.01 grams per liter and preferably at least 0.05 grams per liter. Good results have been obtained using inorganic salts such as halides and more particularly chlorides, oxides, and hydroxides. It is advantageous to use calcium chloride, calcium oxide or calcium hydroxide.

The quantity of compound capable of liberating, in aqueous solution, ions with a positive charge equal to or greater than 2 to be used can vary within wide limits. It is generally chosen between 0.01 and 20 g per liter and preferably between 0.05 and 10 g per liter of water used.

Generally speaking, care is taken to ensure that, when the compound of the invention is added, the pulp be substantially free from anionic surface active agents so as to prevent the formation of salts of these anionic surface active agents with the ions. These salts are in fact capable of promoting the separation of inks. Pulps substantially free from anionic surface active agents are those that contain less than 0.1% and preferably less than 0.05% by wt. of anionic surface active agent based on the weight of dry pulp.

Pulping can be carried out by disintegrating the waste paper according to various methods known per se. Various devices suitable for this purpose can be used. It is thus possible to use disintegrators operating with a high pulp consistency. Examples of devices of this type are described in Tappi Monograph Series No. b 31, 1967, Deinking Waste Paper. Good results have been obtained in pulpers. The consistency of the pulps can vary within wide limits depending on the type of device used. Generally speaking it is between 1 and 50%. In a pulper, pulp consistencies between 1 and 10% are generally used.

The water used for pulping waste paper according to the invention is soft water or water that has been softened by adding an additive capable of removing the hardness of the water. It is thus possible to add sodium carbonate to the water used or any other additive with the same function. Soft water means water whose hardness is less than two degrees and preferably less than one degree of German hardness. Recycled water from which compounds capable of liberating ions such as those defined above are eliminated can also be used to advantage.

The temperature in the device used for disintegration is usually between 20° and 130° C. When operating in a pulper, temperatures between 30° and 90° C. are generally used. The retention time in the disintegration device can vary within wide limits depending on the type of device used. It is usually between 10 seconds and 3 hours. In a pulper, it is generally between 5 and 120 minutes.

One or more complexing agents can be introduced into the device used for the disintegration of waste paper. Various types of complexing agents can be used to this end.

It is thus possible to use acids or salts of acids chosen from ethylenediaminetetraacetic acid, diethylenediaminepentaacetic acid, gluconic acid, polyitaconic acid, tartaric acid, citric acid and phosphonic acid as well as the substituted derivatives of phosphonic acid such as diethylenetriaminepenta (methylenephosphonic) acid. The sodium salts of these acids are quite suitable. It is also possible to use hydroxycarboxylated polymers such as those described in German patent application 1 904 940 filed on the Feb. 1, 1969 in the name of DEGUSSA, as well as hydroxycarboxylated homopolymers or copolymers containing monomeric units of the formula

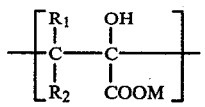

where $R_1$ and $R_2$ represent hydrogen or an alkyl group containing 1–3 carbon atoms which may be substituted by a hydroxyl group or by a halogen atom, $R_1$ and $R_2$ being the same or different and where M represents a hydrogen atom, a sodium atom or a potassium atom or an ammonium group, such as, for example, the polymers described in Belgian Pat. No. 776 705 filed on the Dec. 15, 1971 in the name of SOLVAY AND CO.

These complexing agents can be used in varying quantities. Generally speaking, 0.01 to 2% of complexing agent is used, based on the weight of dry waste paper.

The process according to the invention can also include to advantage a bleaching. This bleaching can be carried out at the same time as pulping or afterwards. Generally speaking, it is preferable to effect the disintegration of waste paper in the presence of bleaching agents.

The bleaching agent used can be a reducing agent or an oxidising agent such as the hypochlorites of alkali metals or peroxygen compounds.

The bleaching agent is generally an oxidising agent and preferably a peroxygen compound. Various types of peroxygen compounds can be used. Generally speaking, inorganic compounds are used such as sodium peroxide or hydrogen peroxide. It is preferable to use hydrogen peroxide.

The bleaching agent concentration is generally between 0.05 and 6% and preferably between 0.1 and 5% of the weight of dry waste paper.

If the bleaching agent is an oxidising agent, the pulp is generally kept at a basic pH. In this case, it is possible to use an alkaline compound for pulping. The alkaline compound can be any compound capable of giving the water an alkaline pH. The compounds that can be used include among others the hydroxides and silicates of alkali metals such as sodium and potassium or mixtures of these. Sodium hydroxide is particularly suitable.

The total concentration of alkaline compounds is generally between 0.2 and 12% of the weight of dry waste paper.

If sodium hydroxide is used, its concentration is generally between 0.1 and 8% and preferably between 0.2 and 5% of the weight of dry waste paper. If sodium silicate is used at the same time, the concentration of this latter is generally between 0.1 and 10% and preferably between 0.2 and 8% of the total weight of dry waste paper. If the oxidising agent has an alkaline nature, as is the case with sodium peroxide, the quantities of other alkaline compounds to be used, if at all, can therefore be much smaller.

Moreover, various other additives such as for instance stabilisers of the peroxygen compound, can be added to the pulp if bleaching is to be carried out using a peroxygen compound.

If the recovery of waste paper includes a bleaching, the compound capable of liberating ions is usually added to the pulp at the end of the bleaching. If, according to a preferred embodiment of the invention, the bleaching agent is added directly to a disintegration device such as a pulper, it is advantageous to introduce the abovementioned compound into this device when disintegration has finished, before discharging the pulp from the device. It is also possible to provide for a device placed at the outlet of the device used for disintegration which permits the introduction of the abovementioned compound into the pulp and ensures intimate mixing.

The pulp treated according to the invention can then, although this is not indispensable, undergo one or more treatments such as cleaning, deflaking and refining. Generally speaking, the pulp treated according to the invention undergoes purification in order to remove solid impurities. Various devices known per se can be used to this end such as cyclones or vibrating screens.

The pulp can then be passed to a thickener. Various types of thickeners known per se can be used with a pulp consistency generally between 15 and 35% and preferably between 20 and 30%.

The aqueous effluent originating from the thickener can be treated by an additive capable of forming, with the ions added according to the invention, insoluble compounds which precipitate out. It is thus possible to add additives such as sodium carbonate to this aqueous effluent. The effluent substantially free from ions according to the invention can be recycled to the disintegration stage after separation of the precipitate, if necessary.

The consistency of the pulp can then be adjusted, generally to a density of 0.1 and 5% and preferably 0.5 to 2% and the diluted pulp can be passed to the paper machines.

The aqueous effluent of the process according to the invention is clear and it is therefore not necessary to separate inks from it in order to recycle said effluent to the disintegration device.

By adding the compound capable of liberating ions at the end of the disintegration stage or at the end of the bleaching stage, as the case may be, it is also possible to obtain a pulp with improved brightness compared with a similar process where the compound capable of liberating ions according to the invention would be added at the beginning of disintegration.

When using the process according to the invention, excellent defibering of waste paper has been observed. Moreover, the final brightness of the product is sufficient without it being necessary to use additional treatments to improve the brightness. The pulp obtained can be used directly for the production of certain printing paper such as newsprint or for the production of coloured envelopes because no streaks of ink are observed on the paper obtained.

In order to illustrate the invention yet without limiting its scope, some practical examples of operating are given below. Example 1 was carried out by way of comparison by introducing a compound liberating calcium ions at the beginning of disintegration. Example 2 was carried out according to the invention. Example 3 was carried out by way of comparison without adding any compound liberating calcium ions.

EXAMPLE 1

The test was carried out in a pulper of the LHO-MARGY type with a capacity of 2 liters. It was conducted on newspaper (type of printing: typography; ash content: 1%).

The paper was cut up by hand before being introduced into the pulper. The aqueous solution containing all the reagents with the exception of hydrogen peroxide was then added. The water used to obtain the pulp had a calcium hardness of 20 German degrees. The consistency of the pulp thus obtained was 4%. The solution was brought to the desired temperature of 50° C. and it was mixed with waste paper for one minute before the introduction of hydrogen peroxide.

The reaction mixture used contained 1% of hydrogen peroxide, 1.15% sodium hydroxide and 0.15% sodium polyalphahydroxyacrylate based on the weight of dry waste paper. The pH at the beginning of the treatment was 10.6.

The treatment in the pulper lasted 30 minutes. At the end of the treatment, the pulp taken out of the pulper was filtered to a consistency of 25% then diluted with hard water to a consistency of 1%. A sample of pulp was taken in order to measure the brightness.

The brightness of the pulp obtained was 36.5% with respect to the brightness of the $BaSO_4$ measured using an Elrepho reflectometer (Zeiss) fitted with the R457 filter (ISO Standard 2470).

The filtration effluent did not contain any ink and had a turbidity measured with a SIGRIST photometer corresponding to 1250 ppm of $SiO_2$.

EXAMPLE 2

The test was carried out in the same device and on the same type of waste paper as test 1 using a similar method, but conducted in two stages.

In the first stage, soft water with a calcium hardness of 0 German degrees was used.

The reaction mixture used contained 1% of hydrogen peroxide, 1% sodium hydroxide and 0.15% sodium polyalphahydroxyacrylate based on the weight of dry waste paper. The pH at the beginning of the treatment was 11.3. The treatment in the pulper lasted 20 minutes.

In the second stage, calcium chloride was then added in sufficient quantity to raise the calcium hardness to 20 German degrees, and 0.15% sodium hydroxide based on the weight of dry waste paper. This second treatment in the pulper lasted ten minutes.

The brightness of the pulp was 49.4% and no streaks of ink were observed on the paper.

The filtration effluent did not contain any ink and had a turbidity corresponding to 750 ppm of $SiO_2$.

EXAMPLE 3

The test carried out under conditions similar to those in test 1.

The water used was soft water. The reaction mixture used contained 1% of hydrogen peroxide, 1% sodium hydroxide and 0.15% sodium polyalphahydroxyacrylate based on the weight of dry waste paper. The pH at the beginning of the treatment was 11.3.

The brightness of the pulp obtained was 52.9% and black specks were observed. The filtration effluent contained large quantities of ink and had a turbidity corresponding to 11250 ppm of $SiO_2$.

What is claimed is:

1. Process for reclaiming waste paper comprising pulping without deinking the waste paper in the presence of water whose hardness is less than 2 degrees of German hardness and then adding to the pulp thus obtained a compound capable of liberating, in aqueous solution, ions with a positive charge equal to or greater than 2, the adding being to a pulp which is substantially free from anionic surface active agents.

2. Process according to claim 1, wherein a compound of calcium or aluminium is used as said compound.

3. Process according to claim 2, wherein a compound selected from the group consisting of calcium chloride, calcium oxide and calcium hydroxide is used as said compound.

4. Process according to any one of claims 1 to 3, wherein said compound is added in a quantity of 0.01 to 20 g per liter of water.

5. Process according to any one of claims 1 to 3, wherein said pulping of the waste paper is carried out in the presence of a bleaching agent.

6. Process according to claim 5, wherein the bleaching agent is selected from the group consisting of hydrogen peroxide and sodium peroxide.

7. Process according to claim 6, wherein the bleaching agent is hydrogen peroxide.

8. Process according to claim 7, wherein the pulping of waste paper is carried out in the presence of 0.05 to 6% of said hydrogen peroxide and 0.2 to 12% of alkaline compounds based on the weight of dry waste paper.

9. Process according to any one claims 1 to 3, wherein the pulping of waste paper is carried out in a pulper operating with a pulp consistency of between 1 and 10%.

10. Process according to claim 9, wherein said compound is introduced into the pulper after the pulp is disintegrated.

* * * * *